US 8,552,971 B2

(12) United States Patent
Ishikawa et al.

(10) Patent No.: US 8,552,971 B2
(45) Date of Patent: Oct. 8, 2013

(54) DRIVING CIRCUIT FOR LIGHT EMITTING DIODE

(75) Inventors: Hiroyuki Ishikawa, Kyoto (JP); Hiroyuki Kumasaka, Kyoto (JP)

(73) Assignee: Rohm Co., Ltd. (JP)

( * ) Notice: Subject to any disclaimer, the term of this patent is extended or adjusted under 35 U.S.C. 154(b) by 392 days.

(21) Appl. No.: 12/934,434

(22) PCT Filed: Mar. 24, 2009

(86) PCT No.: PCT/JP2009/001280
§ 371 (c)(1),
(2), (4) Date: Sep. 24, 2010

(87) PCT Pub. No.: WO2009/119066
PCT Pub. Date: Oct. 1, 2009

(65) Prior Publication Data
US 2011/0018914 A1   Jan. 27, 2011

(30) Foreign Application Priority Data
Mar. 25, 2008   (JP) .................................. 2008-078591

(51) Int. Cl.
*G09G 5/10*   (2006.01)

(52) U.S. Cl.
USPC ........... 345/102; 345/690; 345/691; 345/204; 315/193; 362/97.1; 362/97.2; 362/97.3; 349/69

(58) Field of Classification Search
USPC ............. 345/102, 690, 691, 204; 315/193, 315/297, 312; 362/97.1–97.4, 231; 349/69
See application file for complete search history.

(56) References Cited

U.S. PATENT DOCUMENTS

| | | | |
|---|---|---|---|
| 5,886,475 A * | 3/1999 | Horiuchi et al. ........... 315/169.3 |
| 6,515,434 B1 | 2/2003 | Biebl | |
| 7,233,322 B2 * | 6/2007 | Takehara et al. .............. 345/204 |
| 8,022,892 B2 * | 9/2011 | Nakai et al. ..................... 345/1.1 |
| 2002/0105373 A1 * | 8/2002 | Sudo ............................. 327/538 |
| 2002/0130830 A1 | 9/2002 | Park | |
| 2003/0030602 A1 * | 2/2003 | Kasai .............................. 345/76 |
| 2003/0137481 A1 | 7/2003 | Nishida | |
| 2004/0263437 A1 * | 12/2004 | Hattori ............................ 345/76 |
| 2005/0057580 A1 * | 3/2005 | Yamano et al. ............... 345/690 |
| 2005/0174320 A1 | 8/2005 | Park | |
| 2005/0184952 A1 | 8/2005 | Konno et al. | |

(Continued)

FOREIGN PATENT DOCUMENTS

| CN | 1370035 A | 9/2002 |
|---|---|---|
| CN | 1432992 A | 7/2003 |

(Continued)

OTHER PUBLICATIONS

Senda, JP 2007-129862 A, machine translation.*

(Continued)

*Primary Examiner* — Lun-Yi Lao
*Assistant Examiner* — Peter D McLoone
(74) *Attorney, Agent, or Firm* — Cantor Colburn LLP (57) ABSTRACT

An LED driving circuit drives multiple channels of light emitting units which provide a function as a backlight for a liquid crystal panel. An interface unit receives a luminance setting signal that specifies the luminance for each channel. The LED driving circuit drives each of the multiple channels of light emitting units with a luminance that corresponds to the luminance setting signal.

6 Claims, 8 Drawing Sheets

(56) References Cited

U.S. PATENT DOCUMENTS

| | | | |
|---|---|---|---|
| 2005/0202851 A1 | 9/2005 | Yamamoto et al. | |
| 2006/0175986 A1 | 8/2006 | Lee et al. | |
| 2006/0255838 A1 | 11/2006 | Bergmann | |
| 2007/0046611 A1* | 3/2007 | Routley et al. | 345/98 |
| 2009/0073096 A1* | 3/2009 | Mittal et al. | 345/82 |
| 2009/0079677 A1* | 3/2009 | Kasai | 345/76 |
| 2010/0301762 A1* | 12/2010 | Kung et al. | 315/193 |
| 2011/0057969 A1* | 3/2011 | Gao | 345/691 |

FOREIGN PATENT DOCUMENTS

| | | |
|---|---|---|
| CN | 1661917 A | 8/2005 |
| DE | 19950135 A1 | 4/2001 |
| JP | 2001-142409 A | 5/2001 |
| JP | 2002-202767 A | 7/2002 |
| JP | 2002-252971 A | 9/2002 |
| JP | 2002-319707 A | 10/2002 |
| JP | 2003-512733 A | 4/2003 |
| JP | 2003-216113 A | 7/2003 |
| JP | 2004-32875 A | 1/2004 |
| JP | 2005-258403 A | 9/2005 |
| JP | 2005-277391 A | 10/2005 |
| JP | 2006-216535 A | 8/2006 |
| JP | 2007-28784 A | 2/2007 |
| JP | 2007-129862 A | 5/2007 |
| JP | 2007-173813 A | 7/2007 |
| JP | 2008-51905 A | 3/2008 |
| KR | 2002-0032018 A | 5/2002 |
| KR | 2002-0066216 A | 8/2002 |
| KR | 2002-0073353 A | 9/2002 |
| KR | 10-2006-0043186 A | 5/2006 |
| KR | 10-2006-0089375 A | 8/2006 |
| KR | 10-2008-0034864 A | 4/2008 |
| TW | 226599 B | 1/2005 |
| TW | 274426 B | 2/2007 |
| TW | 289695 B | 11/2007 |
| WO | 01/30119 A1 | 4/2001 |

OTHER PUBLICATIONS

International Preliminary Report on Patentability for International Application No. PCT/JP2009/001280 dated Sep. 28, 2010.

International Search Report for International Application No. PCT/JP2009/001280 with English translation mailed on Apr. 21, 2009.

Notification of Transmittal of Translation of the International Preliminary Report on Patentability for International Application No. PCT/JP2009/001280 mailed on Nov. 18, 2010.

The First Office Action for Chinese Application No. 20098000352.4, issued Feb. 16, 2012, with English translation.

JP Office Action for JP Patent Application No. 2009526428; Dispatch No. 480306; with English Translation; 8 pgs.

* cited by examiner

PWMCNT(PWM control : Read/Write,00h)

| Bit | 7 | 6 | 5 | 4 | 3 | 2 | 1 | 0 |
|---|---|---|---|---|---|---|---|---|
| Reg. Name | PWMRST | not_used | not_used | not_used | not_used | not_used | PARADRV | PWMEN |
| Initial value | 0 | 0 | 0 | 0 | 0 | 0 | 0 | 0 |

FIG.8A

LEDEN(LED ON/OFF control : Read/Write,01h)

| Bit | 7 | 6 | 5 | 4 | 3 | 2 | 1 | 0 |
|---|---|---|---|---|---|---|---|---|
| Reg. Name | LED8EN | LED7EN | LED6EN | LED5EN | LED4EN | LED3EN | LED2EN | LED1EN |
| Initial value | 0 | 0 | 0 | 0 | 0 | 0 | 0 | 0 |

FIG.8B

SETPWM11(LED1 PWM pulse width 1 : Read/Write,02h)

| Bit | 7 | 6 | 5 | 4 | 3 | 2 | 1 | 0 |
|---|---|---|---|---|---|---|---|---|
| Reg. Name | PWMLED1[7] | PWMLED1[6] | PWMLED1[5] | PWMLED1[4] | PWMLED1[3] | PWMLED1[2] | PWMLED1[1] | PWMLED1[0] |
| Initial value | 0 | 0 | 0 | 0 | 0 | 0 | 0 | 0 |

SETPWM12(LED1 PWM pulse width 2 : Read/Write,03h)

| Bit | 7 | 6 | 5 | 4 | 3 | 2 | 1 | 0 |
|---|---|---|---|---|---|---|---|---|
| Reg. Name | not_used | not_used | not_used | not_used | not_used | not_used | PWMLED1[9] | PWMLED1[8] |
| Initial value | 0 | 0 | 0 | 0 | 0 | 0 | 0 | 0 |

FIG.8C

DRIVING CIRCUIT FOR LIGHT EMITTING DIODE

This is a U.S. national stage application of International Application No. PCT/JP2009/001280, filed on 24 Mar. 2009. Priority under 35 U.S.C. §119(a) and 35 U.S.C. §365(b) is claimed from Japanese Application No. JP2008-078591, filed 25 Mar. 2008, the disclosure of which is also incorporated herein by reference.

BACKGROUND OF THE INVENTION

1. Field of the Invention

The present invention relates to a driving circuit for light emitting diodes, and particularly to a dimming technique for light emitting diodes used as a backlight for a liquid crystal panel.

2. Description of the Related Art

As a backlight for a liquid crystal panel, white light-emitting diodes (which will be referred to as "LEDs" hereafter) having improved properties from the perspective of a long operating life, low power consumption, and a wide color range are employed instead of conventional CCFLs (Cold Cathode Fluorescent Lamps) or EEFLs (External Electrode Fluorescent Lamps).

Each LED to be driven is provided to the back face of a liquid crystal panel. The increasing size of liquid crystal panels leads to a difficulty in driving all the LEDs using a single driving circuit. In order to solve such a problem, in general, the liquid crystal panel is divided into multiple areas, and driving circuits are provided in increments of areas.

[Patent Document No. 1]
 Japanese Patent Application Laid Open No. 2004-32875
[Patent Document No. 2]
 Japanese Patent Application Laid Open No. 2002-252971
[Patent Document No. 3]
 Japanese Patent Application Laid Open No. 2007-028784
[Patent Document No. 4]
 Japanese Patent Application Laid Open No. 2007-173813

Such an arrangement employing LEDs as a backlight is capable of providing an improved contrast ratio by changing the luminance of the backlight (area control operation) according to the contrast of an image to be displayed on the liquid crystal panel.

SUMMARY OF THE INVENTION

The present invention has been made in view of such a situation. It is an exemplary purpose of the present invention to provide a driving circuit for LEDs which is capable of adjusting the luminance in increments of areas.

MEANS TO SOLVE THE PROBLEM

An embodiment of the present invention relates to a driving circuit for a plurality of channels of light-emitting diodes providing a function as a backlight for a liquid crystal panel. The driving circuit includes: an interface unit which receives, from an external processor, a luminance setting signal which specifies a luminance for each channel; and a driving circuit which drives multiple channels of light emitting diodes with luminance according to the luminance settings.

Also, the driving circuit may include: a booster circuit which supplies a driving voltage to the anode terminal of the light emitting diode for each channel; and multiple current drivers which are provided in increments of channels and which are connected to the cathodes of the corresponding light emitting diodes. Also, the booster circuit may monitor the voltages of the cathodes of the light emitting diodes of multiple channels. Also, the booster circuit may adjust the driving voltage such that the smallest electric potential selected from among the electric potentials thus monitored matches a predetermined target value.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
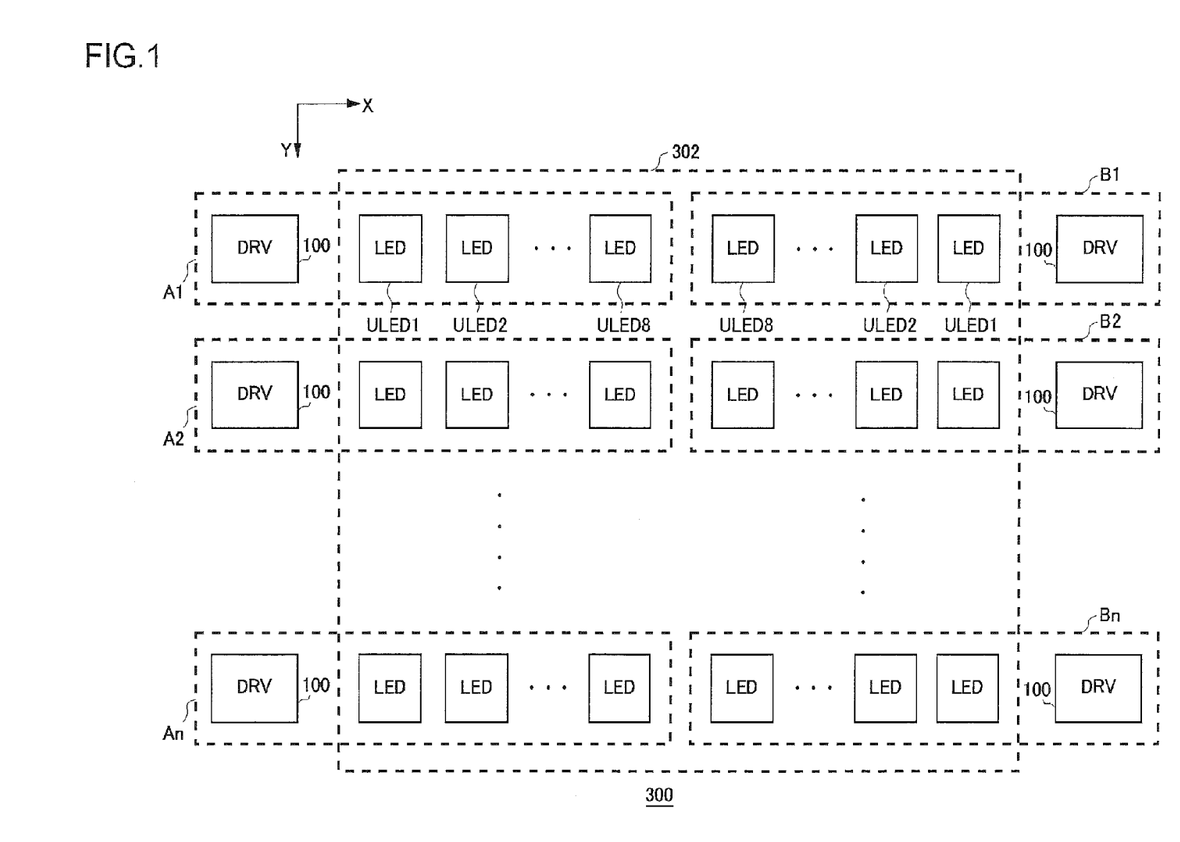
FIG. 1 is a block diagram which shows the configuration of a liquid crystal display according to an embodiment.

FIG. 1 is a block diagram which shows a configuration of a liquid crystal display 300 according to an embodiment. The liquid crystal display 300 includes a liquid crystal panel 302, multiple light-emitting units ULED, and multiple driving circuits 100. In addition, the liquid crystal display 300 includes a processor, and a source driver, a gate driver, and a timing controller for the liquid crystal panel 302, etc., which are not shown.

The liquid crystal panel 302 is virtually divided into two areas in the horizontal direction, and into n (n is an integer of 2 or more) areas in the vertical direction. That is to say, the liquid crystal panel 302 has regions A1 through An on the left side, and regions B1 through Bn on the right side. The integer n is determined according to the size of the liquid crystal panel.

Each of the regions A1 through An and B1 through Bn includes eight light-emitting units ULED1 through ULED8 arranged along the horizontal direction. Each of the light-emitting units ULED1 through ULED8 includes multiple LED elements connected in series. An LED driving circuit 100 is provided for each of the regions A1 through An and B1 through Bn. Each LED driving circuit 100 drives the multiple light emitting units ULED1 through ULED8 that belong to the corresponding single region.

Each LED driving circuit 100 receives, as an input signal from an unshown CPU (Central Processing unit), a luminance setting signal for setting the luminance of each light-emitting unit ULED. The LED driving circuit 100 is configured so as to allow the luminance of the light-emitting units ULED1 through ULED8 that belong to a single region to be independently adjusted.

Such a configuration described above allows the luminance of the backlight to be changed in increments of independent areas, thereby improving the contrast ratio.

Figure 2:
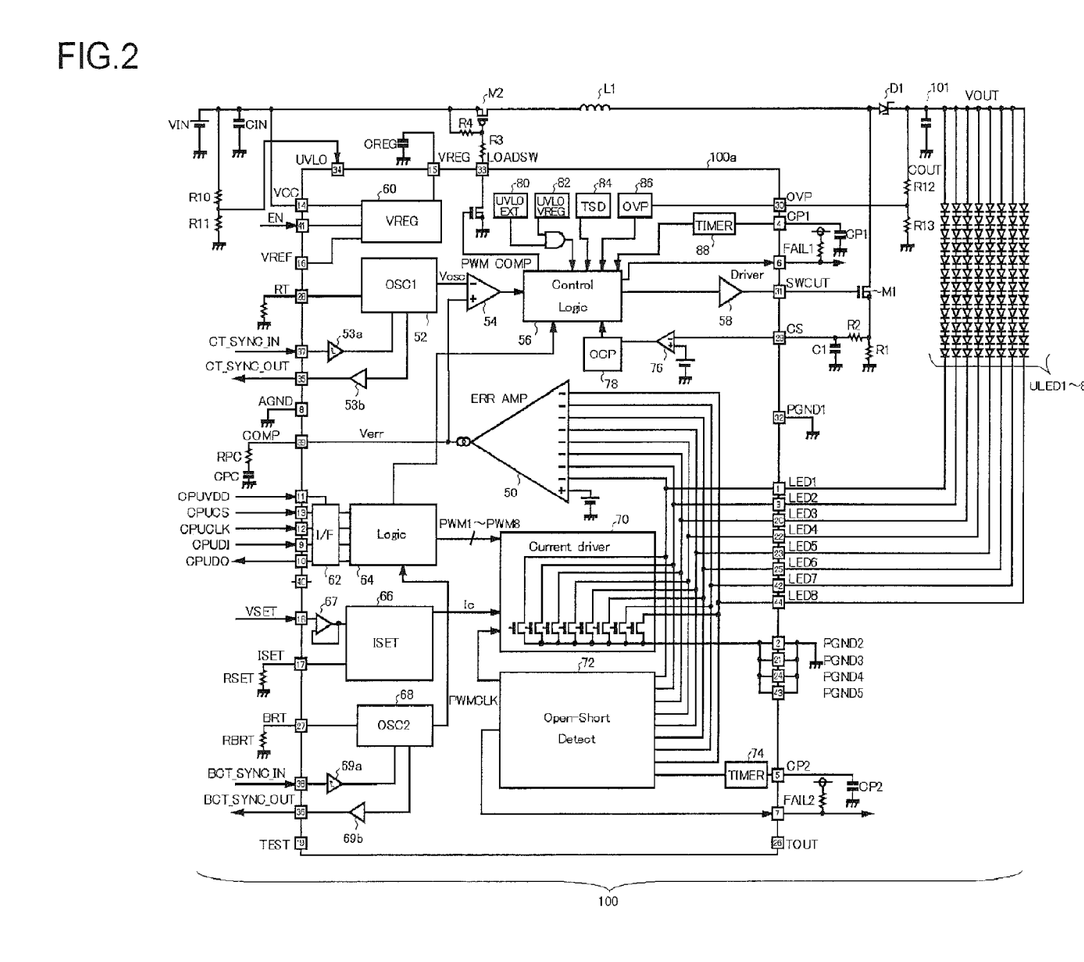
FIG. 2 is a circuit diagram which shows the configuration of an LED driving circuit according to the embodiment.

Detailed description will be made regarding the configuration of the LED driving circuit 100. FIG. 2 is a circuit diagram which shows the configuration of the LED driving circuit 100 according to the embodiment. The multiple (eight) light-emitting units ULED1 through ULED8 are to be driven by the LED driving circuit 100. Also, a single light-emitting unit will be referred to as a "channel" hereafter.

The LED driving circuit 100 can be roughly classified into two blocks, i.e., a booster power supply (switching regulator) which supplies a driving voltage Vout to the multiple light-emitting units ULED and a current driver which controls electric currents that flow through the multiple light-emitting units ULED.

Figure 3:
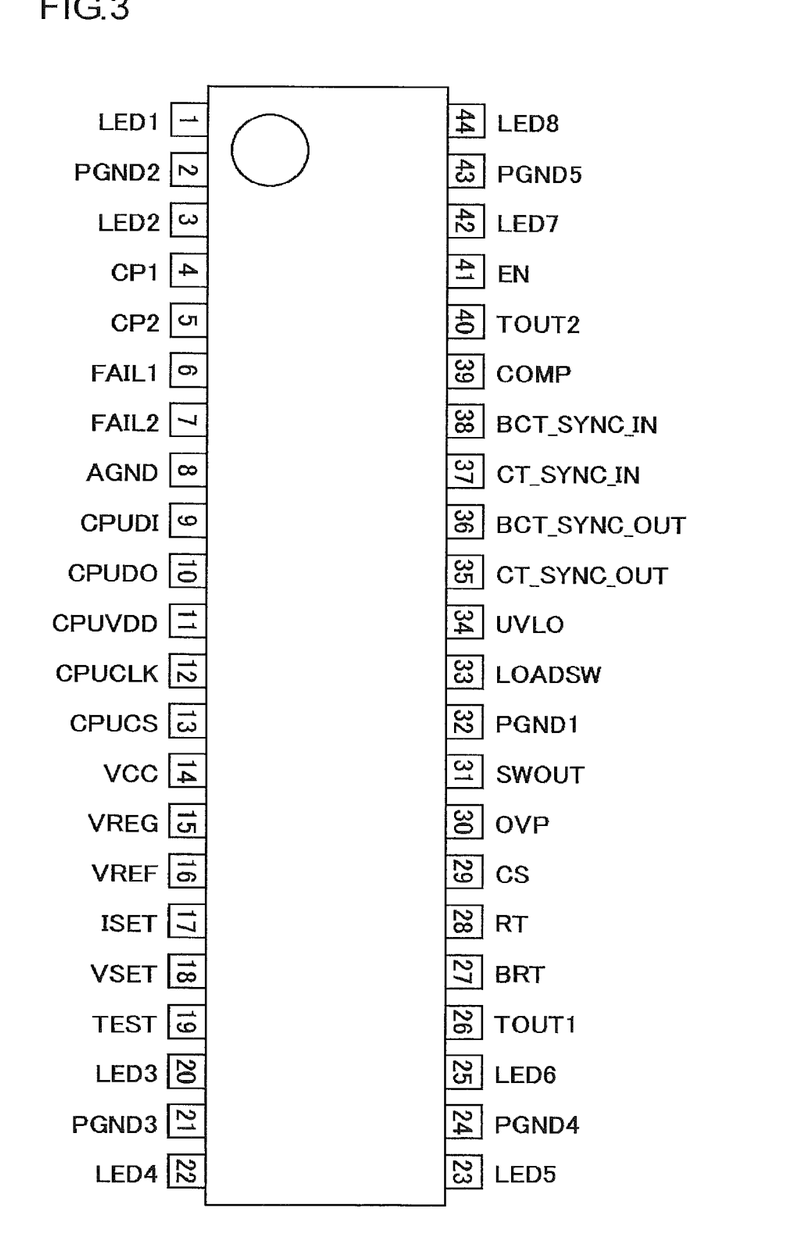
FIG. 3 is a diagram which shows a pin layout of a driver IC.

The LED driving circuit 100 has a configuration including a function IC (which will be referred to as the "driver IC" hereafter) 100a, in which circuit components are monolithically integrated on a single semiconductor substrate, and peripheral circuit components thereof. The driver IC 100a includes first through 44th pins as input/output terminals. FIG. 3 is a diagram which shows the pin layout of the driver IC 100a. Description will be made regarding the name and function of each terminal with reference to the circuit diagram shown in FIG. 2.

Returning to FIG. 2, an input voltage Vin is supplied to the LED driving circuit 100. The input voltage Vin is smoothed using a capacitor CIN, and the input voltage Vin thus smoothed is supplied to a power supply terminal VCC provided as the 14th pin. A regulator 60 includes a linear regulator and a band-gap regulator. The linear regulator steps down the voltage supplied via the power supply terminal VCC, and outputs a stabilized voltage VREG via a stabilized voltage terminal VREG provided as the 15th pin. The stabilized voltage terminal VREG is connected to a stabilized capacitor CREG which provides a function as an output capacitor for the linear regulator. The stabilized voltage VREG is supplied to the other blocks in the driver IC 100a. The 8th pin is a ground terminal AGND for an analog block. The 32nd pin is a ground terminal PGND1 for a digital block.

The band-gap regulator included within the regulator 60 generates a reference voltage VREF using the voltage at the power supply terminal VCC. The reference voltage VREF is used as a reference voltage used in internal components included within the driver IC 100a, and is output to an external circuit via a reference voltage terminal VREF provided as the 16th pin.

A low-voltage lockout circuit 82 monitors the stabilized voltage VREG generated by the regulator 60, and detects a low-voltage state in which the stabilized voltage VREG is smaller than a threshold voltage. The input voltage VIN is divided by resistors R10 and R11, and the input voltage thus divided is supplied to an UVLO (Under Voltage Lock Out) terminal provided as the 34th pin. The low-voltage lockout circuit 80 monitors the voltage at the UVLO terminal, and detects a low-voltage state in which the input voltage is smaller than a predetermined threshold voltage. The signals which indicate the low-voltage state generated by the low-voltage lockout circuit 80 and the low-voltage lockout circuit 82 are output to a control logic unit 56 via an AND gate. A thermal shutdown circuit 84 monitors the temperature of the driver IC 100a, and outputs, to the control logic unit 56, a signal which indicates whether or not an abnormal temperature state has occurred.

Resistors R12 and R13 are provided in series between an output terminal 101 and a ground terminal, which divides an output voltage VOUT. The output voltage thus divided is supplied to an overvoltage protection terminal OVP provided as the 30th pin. The overvoltage protection circuit monitors the electric potential at the overvoltage protection terminal OVP, and detects an overvoltage state of the output voltage VOUT.

A load switch M2 is a P-channel MOSFET (Metal Oxide Semiconductor Field Effect Transistor), and the input voltage VIN is applied to one terminal thereof. A fourth resistor R4 is provided between the gate and source of the load switch M2. A third resistor R3 is provided between a load switch terminal LOADSW provided as the 33rd pin and the gate of the load switch M2. The load switch M2 is provided in order to prevent the input terminal VIN from coupling with the output terminal 101 via an inductor L1 and a rectifier diode D1 when the boosting operation has stopped.

The inductor L1, a switching transistor M1, and a first resistor R1 are provided in series between the drain of the load switch M2 and the fixed voltage terminal (ground terminal). The switching transistor M1 is an N-channel MOSFET, and the gate thereof is connected to a switch-out terminal SWOUT provided as the 31st pin. A second resistor R2 is provided between a current sense terminal CS provided as the 29th pin and the source of the switching transistor M1. A capacitor C1 is provided between the current sense terminal CS and the ground terminal. The second resistor R2 and the capacitor C1 form a low-pass filter, which smoothes the pulse-shaped voltage drop that occurs at the first resistor R1, and the voltage thus smoothed is supplied to the current sense terminal CS.

An overcurrent detection comparator 76 compares the electric potential at the current sense terminal CS with a predetermined threshold voltage. An overcurrent protection circuit 78 detects whether or not an overcurrent state has occurred with reference to the comparison result obtained by the overcurrent detection comparator 76.

The control logic unit 56 receives various kinds of abnormal-state notice signals output from the low-voltage lockout circuit 80, the low-voltage lockout circuit 82, the thermal shutdown circuit 84, the overvoltage protection circuit 86, and the overcurrent protection circuit 78. A timer 88 is connected to the control logic unit 56. In a case in which an abnormal state continues for a predetermined period of time, the control logic unit 56 stops the switching operation for the switching transistor M1. Furthermore, in a case in which at least one abnormal circuit state occurs, a fail signal is output via a failure terminal FAIL1 provided as the 6th pin. A capacitor terminal CP1 provided as the 4th pin is connected to a capacitor CP1 for setting the time constant of the timer 88.

An output capacitor COUT is provided between the ground terminal and the output terminal 101. The rectifier diode D1 is provided between the output terminal 101 and the drain of the switching transistor M1 (connection node that connects the switching transistor M1 and the inductor L1) such that the cathode thereof is connected on the output capacitor COUT side. The driver IC 100a boosts the input voltage VIN by performing a switching operation for the switching transistor M1, thereby generating the output voltage VOUT (which will also be referred to as the "driving voltage") at the output terminal 101.

An enable signal output from an unshown CPU is input to an enable terminal EN provided as the 41st pin. When the enable signal EN is at the high level, the regulator 60 generates the stabilized voltage VREG. When the enable signal EN is at the low level, the regulator 60 stops the generation of the stabilized voltage VREG, whereupon the driver IC 100a enters the standby state.

The multiple light emitting units ULED1 through ULED8 are connected to the output terminal 101. The cathode terminals of the light emitting units ULED1 through ULED8 are connected to terminals LED1 through LED8, respectively. The terminals LED1 through LED8 correspond to the first, third, 20th, 22nd, 25th, 42nd, and 44th pins, respectively.

A current driver 70 is connected to the terminals LED1 through LED8, and controls the currents that flow through the light emitting units ULED1 through ULED8. Detailed description will be made later regarding the configuration and the operation of the current driver 70. The current driver 70 is grounded via ground terminals PGND2 through PGND5 that correspond to the 2nd pin, 21st pin, 24th pin and 43rd pin, respectively.

An error amplifier 50 includes multiple inverting input terminals. The voltages at the terminals LED1 through LED8 are applied to the respective inverting input terminals. Furthermore, a predetermined reference voltage Vref is input to the non-inverting input terminal of the error amplifier 50. The error amplifier 50 selects the smallest voltage from among the voltages thus applied to the inverting input terminals, amplifies the difference between the smallest voltage thus selected and the reference voltage, and outputs a current that corresponds to the difference. The output terminal of the error amplifier 50 is connected to a terminal COMP provided as the 39th pin. A resistor RPC and a capacitor CPC are connected in series between the terminal COMP and the ground terminal. The current output from the error amplifier 50 is converted into an error voltage Verr by means of the resistor RPC and the capacitor CPC. The error voltage Verr that occurs at the terminal COMP is supplied to the non-inverting input terminal of a PWM comparator 54.

A first oscillator 52 generates a cyclic voltage Vosc. An RT terminal provided as the 28th pin is connected to a resistor RT for setting the frequency of the cyclic voltage Vosc. With such an arrangement, the first oscillator 52 operates in either a master mode or a slave mode. When the first oscillator 52 operates in the master mode, the first oscillator 52 oscillates at a frequency according to the resistor RT, thereby generating a cyclic voltage Vosc. When the first oscillator 52 operates in the master mode, the first oscillator 52 outputs a synchronous pulse signal according to the cyclic voltage Vosc. The synchronous signal is output through a buffer 53b from a CT_SYNC_OUT terminal provided as the 35th pin.

Via a CT_SYNC_IN terminal provided as the 37th pin, an external synchronous pulse signal can be input. The synchronous pulse signal is input to the first oscillator 52 via a buffer 53a. In a case in which the first oscillator 52 has been set to the slave mode, the first oscillator 52 generates a cyclic voltage Vosc synchronously with the synchronous pulse signal input via the CT_SYNC_IN terminal.

As shown in FIG. 1, the liquid crystal display 300 has a configuration including multiple LED driving circuits 100. Accordingly, an arrangement is preferably made in which, of the multiple LED driving circuits 100, a single desired LED driving circuit 100 is used as a master circuit, and the other driving circuits 100 are used as slave circuits. By setting the first oscillator 52 included in the master circuit to the master mode, and by operating the first oscillator 52 included in each slave circuit in the slave mode using a synchronous signal received from the first oscillator 52 included in the master circuit, such an arrangement is capable of synchronizing the operations of the switching regulators included in the multiple LED driving circuits 100.

The sawtooth waveform or triangular waveform cyclic signal Vosc generated by the first oscillator 52 is input to the inverting input terminal of the PWM comparator 54. The PWM comparator 54 compares the cyclic voltage Vosc with the error signal Verr, and generates a pulse width modulation signal Spwm according to the comparison result.

The PWM signal Spwm generated by the PWM comparator 54 is supplied to the driver 58 via the control logic unit 56. The driver 58 performs a switching operation for the switching transistor M1 according to the PWM signal Spwm.

The switching regulator is principally formed of the above-described components. With such a switching regulator, the output voltage VOUT can be feedback controlled such that the smallest voltage selected from among the cathode voltages of the multiple light emitting units ULED matches the reference voltage Vref which is a target value.

Next, description will be made regarding an arrangement for independently setting the luminance of each of the multiple light emitting units ULED.

The current driver 70 performs switching operations for switches provided on the paths for the light emitting units ULED1 through ULED8 so as to pulse width modulate the light emitting period for each LED, thereby adjusting the luminance thereof.

A setting signal received from the CPU includes data which specifies the duty ratio of the light-emitting period and the non-light-emitting period, i.e., the pulse width obtained by the pulse width modulation for each of the multiple light emitting units ULED.

A current setting unit 66 and a buffer 67 are circuits for setting a value used as a reference value for a current that flows through each light emitting unit ULED. An external voltage is applied to a voltage setting terminal VSET provided as the 18th pin. The current setting unit 66 receives the external voltage thus applied via the buffer 67, and generates a constant current Ic which is proportional to the voltage value thereof. A current setting terminal ISET provided as the 17th pin is connected to a resistor RSET for setting a proportional constant.

The current driver 70 supplies a current proportional to the constant current Ic to each light emitting unit ULED intermittently. The current driver 70 adjusts the light emitting period (ON period), thereby adjusting the luminance thereof.

Figure 4:
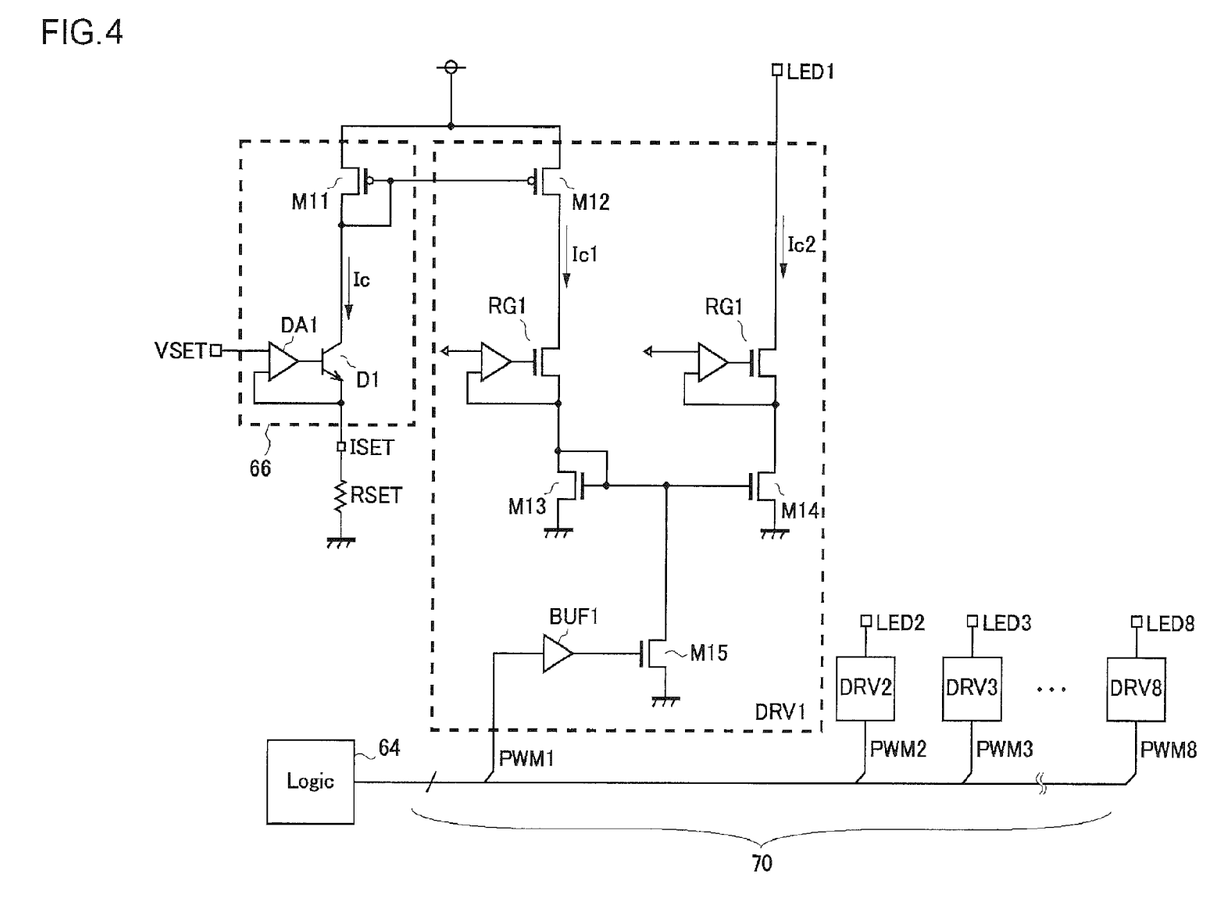
FIG. 4 is a circuit diagram which shows the configuration of a current setting unit, a current driver, and peripheral circuits thereof.

FIG. 4 is a circuit diagram which shows a configuration of the current setting unit 66, the current driver 70, and peripheral circuits thereof.

The current driver 70 shown in FIG. 4 includes multiple driving units DRV1 through DRV8 provided to the light emitting units ULED1 through ULED8, respectively. The driving units DRV1 through DRV8 have the same configuration. Accordingly, detailed description will be made only regarding the driving unit DRV1.

The driving unit DRV1 includes a switch SW1 provided on a current path for the corresponding light emitting unit ULED1. The driving unit DRV1 performs a switching operation for the switch SW1 according to a pulse signal PWM1 output from the logic unit 64. That is to say, during the ON period of the switch SW1, a current flows through the light emitting unit ULED1. During the OFF period of the switch SW1, a current that flows through the light emitting unit ULED1 is blocked, which stops the light emitting operation. The light emitting unit ULED1 alternately switches between the light emitting state and the non-light emitting state according to the switching operation. The luminance of the light emitting unit ULED1 is adjusted by adjusting the time ratio between the light emitting period and the non-light-emitting period.

The current setting unit 66 generates the constant current Ic. The current setting unit 66 includes the resistor RSET, in addition to a transistor D1 and an operational amplifier DA1. The electric potential at the emitter of the transistor D1, i.e., the electric potential at the current setting terminal ISET, is stabilized at the setting voltage VSET by means of the operational amplifier DA1. As a result, the current setting unit 66 generates the constant current Ic (=VSET/RSET). A transistor M11 is provided on a path for the constant current Ic.

The driving unit DRV1 includes a transistor M12, a regulator RG1, a regulator RG2, and transistors M13 and M14.

The transistor M12 and the transistor M11 are arranged such that the gates thereof are connected so as to form a common gate terminal, and such that the sources thereof are connected so as to form a common source terminal. Such a circuit configuration provides a current mirror circuit. A constant current Ic1, which is proportional to the constant current Ic, flows through the transistor M12.

The transistor M13 is provided on a path for the constant current Ic1 that flows through the transistor M12. The transistor M14 and the transistor M13 form a current mirror circuit, thereby generating a constant current Ic2 which is proportional to the constant current Ic1. The drain voltage of the transistor M13 is stabilized at a predetermined value by the regulator RG1. In the same way, the drain voltage of the transistor M14 is stabilized at the predetermined value by the regulator RG2. The regulators RG1 and RG2 set the drain voltages of the transistors M13 and M14 to the same value, thereby stabilizing the mirror ratio of the current mirror circuit.

The transistor M14 provides a function as a switch for switching the driving current for the light emitting unit ULED1. A transistor M15 is provided between the gate of the transistor M14 and the ground terminal. When the transistor M15 is in the OFF state, the transistor M14 is in the ON state, whereupon the constant current Ic2 flows through the light emitting unit ULED1. When the transistor M15 is in the ON state, the transistor M14 is in the OFF state, which blocks the current that flows through the light emitting unit ULED1, thereby stopping the light emitting operation.

The switching operation for the transistor M14 is performed according to the pulse signal PWM1 supplied from the logic unit 64. The logic unit 64 generates pulse signals PWM1 through PWM8 having duty ratios (ratio between the current conduction period and the cycle period) that correspond to the light emitting luminance values of the multiple light emitting units ULED1 through ULED8, respectively, and outputs the pulse signals thus generated to the corresponding driving units DRV1 through DRV8, respectively. The pulse signal PWM1 is supplied to the transistor M15 via a buffer BUF1.

It should be noted that the driving units DRV2 through DRV8 have the same configuration as that of the driving unit DRV1. The gates of the transistors M12 included in these driving units are connected so as to form a common gate terminal.

The current driver 70 can be used in a switchable mode, i.e., it can be switched between an independent driving mode and a parallel driving mode.

In the independent driving mode, the ON/OFF states of the transistors M14 included in each of the multiple channel driving units DRV1 through DRV8 are independently controlled.

In the parallel driving mode, the even-numbered channel driving units DRV2, DRV4, DRV6, and DRV8 perform switching operations synchronously with the adjacent odd-numbered channel driving units DRV1, DRV3, DRV5, and DRV7, respectively. That is to say, the duty ratios of the pulse signals PWM2, PWM4, PWM6, and PWM8 are set to those of the signals PWM1, PWM3, PWM5, and PWM 7, respectively.

Figure 5A:
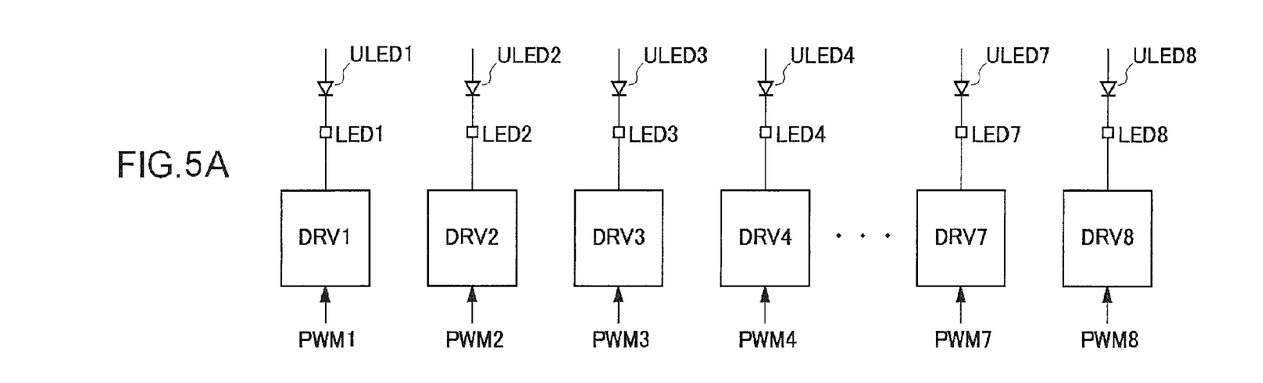
FIGS. 5A and 5B are circuit diagrams which show the usages in the independent mode and the parallel driving mode.
Figure 5B:
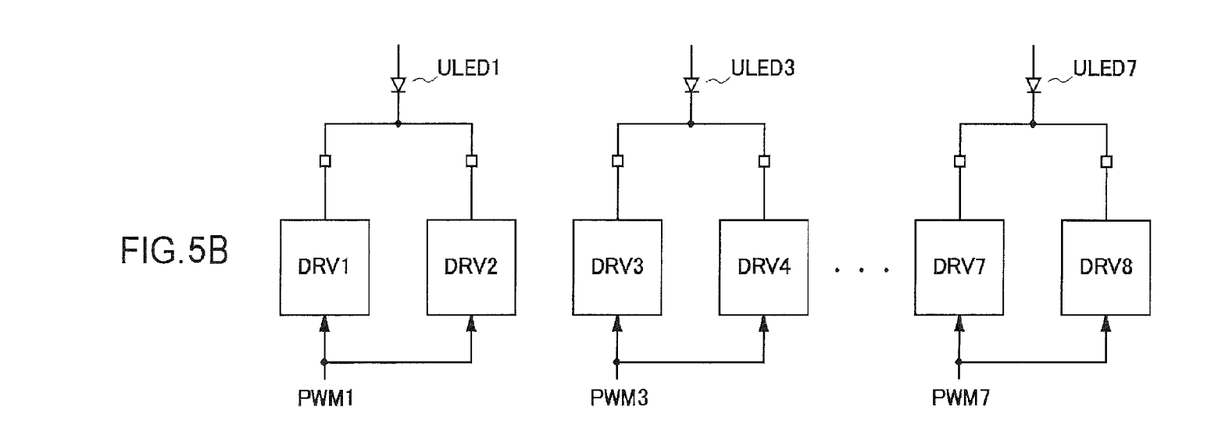

FIG. 5A and FIG. 5B are circuit diagrams which show the usage in the independent mode and the parallel driving mode. As shown in FIG. 5A, in the independent driving mode, the terminals LED1 through LED8 are connected to the light emitting units ULED1 through ULED8, thereby allowing the luminance thereof to be set independently. On the other hand, in the parallel driving mode, as shown in FIG. 5B, each pair of two adjacent terminals LED is connected to a single light emitting unit. The adjacent driving units drive a common light emitting unit ULED according to pulse signals having the same duty ratio. In the parallel driving mode, the driving units are jointly operated in parallel. Thus, such an arrangement doubles the driving current to be supplied to each light emitting unit ULED. The mode switching between the independent driving mode and the parallel driving mode can be performed according to a setting signal received from the CPU.

Returning to FIG. 2, description will be made regarding the generation of the pulse signals PWM1 through PWM8.

The pulse signals PWM1 through PWM8, each of which has a duty ratio that corresponds to the luminance, is generated based upon a clock signal PWMCLK generated by a second oscillator 68. The clock signal PWMCLK is set to around 600 Hz.

The second oscillator 68 is configured such that it operates in either the master mode or the slave mode, in the same way as with the first oscillator 52. In the master mode, the second oscillator 68 oscillates at a predetermined frequency, and outputs a synchronous signal via a buffer 69b and a BCT_SYNC_OUT terminal provided as the 36th pin. A resistor RBRT is connected to a 27th pin for setting the oscillation frequency in the master mode. In the slave mode, the second oscillator 68 generates the clock signal PWMCLK synchronously with a synchronous signal input via a BCT_SYNC_IN terminal provided as the 38th pin and a buffer 69a.

The clock signal PWMCLK is output to the logic unit 64. The logic unit 64 includes a counter which counts the clock signal PWMCLK. The logic unit 64 includes registers to which luminance setting data PWMLED1 through PWMLED8 are written for specifying the pulse width (i.e., duty ratio) for each of the light emitting units ULED1 through ULED8. The luminance setting data PWMLED1 through PWMLED8 are each 10 bits long.

Figure 6:
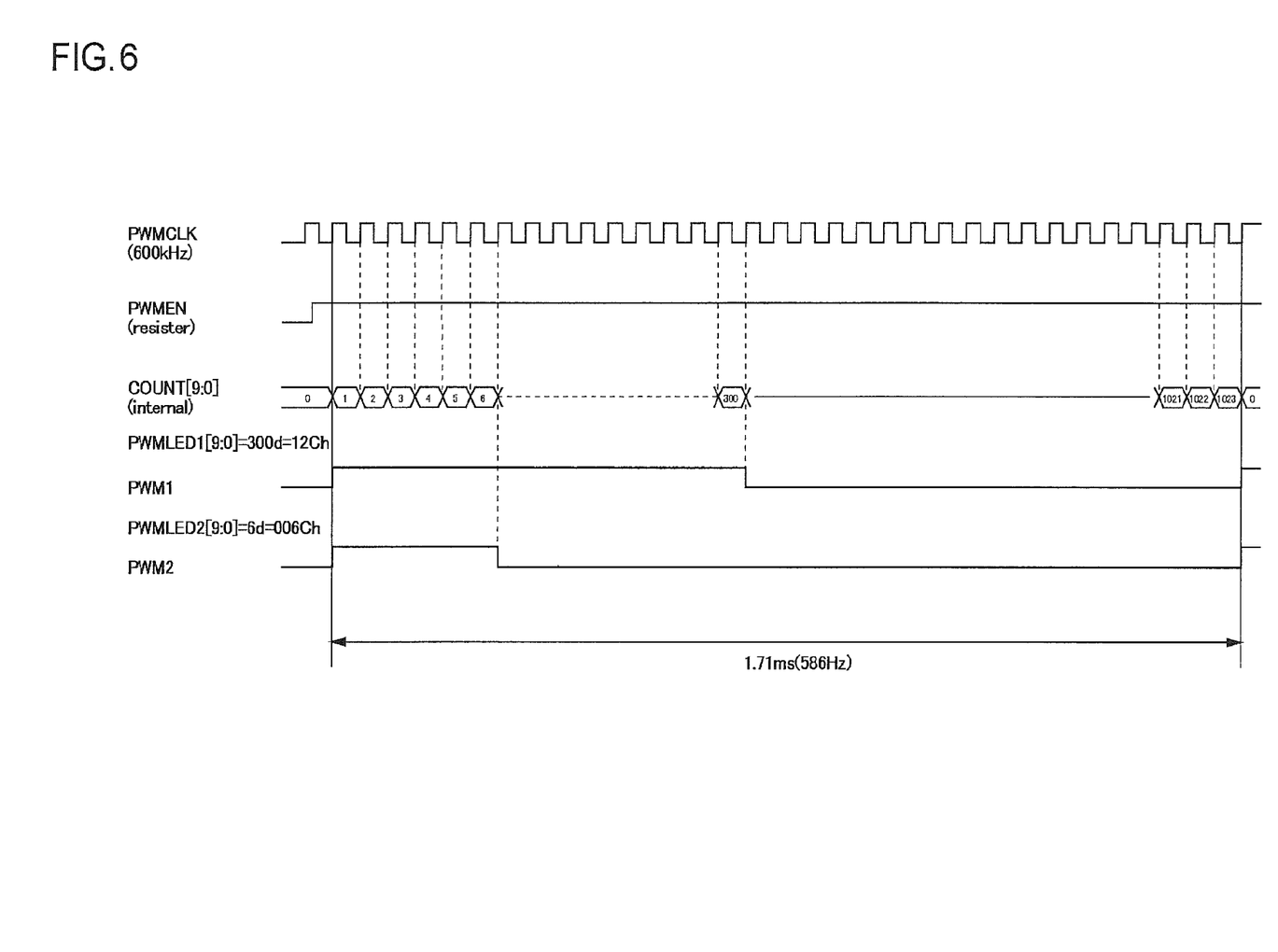
FIG. 6 is a time chart which shows generation of a pulse signal PWM.

FIG. 6 is a time chart which shows the generation of the pulse signals PWM. The driver IC 100a includes a serial interface for communicating with the CPU. The driver IC 100a receives a clock signal CPUCLK, a chip select signal CPUCS, and a data signal CPUDI output from the CPU. Furthermore, the driver IC 100a outputs data CPUDO to the CPU. Specifically, the power supply voltage VDD for a digital circuit on the CPU (Central Processing Unit) side is supplied to 11th pin. The chip select signal CPUCS is input to the 13th pin. The clock signal CPUCLK is input to the 12th pin. The data signal CPUDI is input to the 9th pin. In addition, the data signal CPUDO is output via the 10th pin.

Figure 7A:
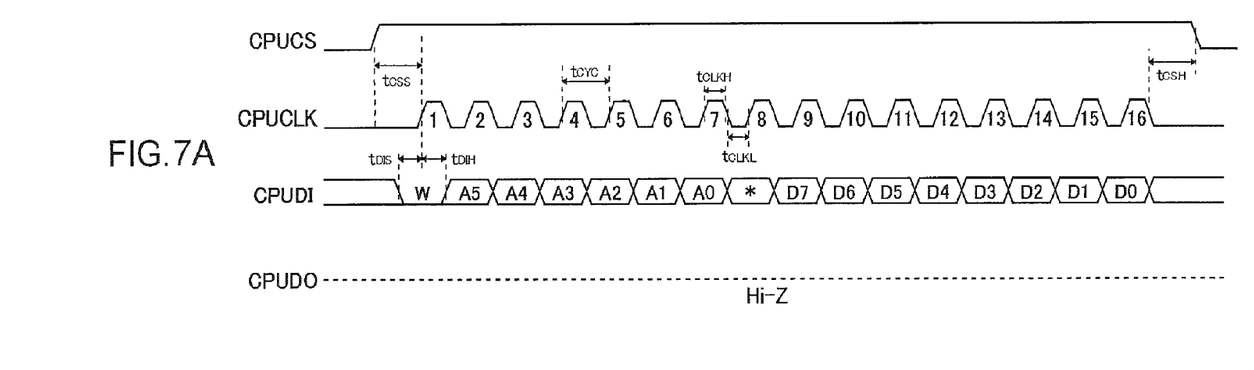
FIGS. 7A and 7B are time charts which show transmission/reception of data between the driver IC and a CPU.
Figure 7B:
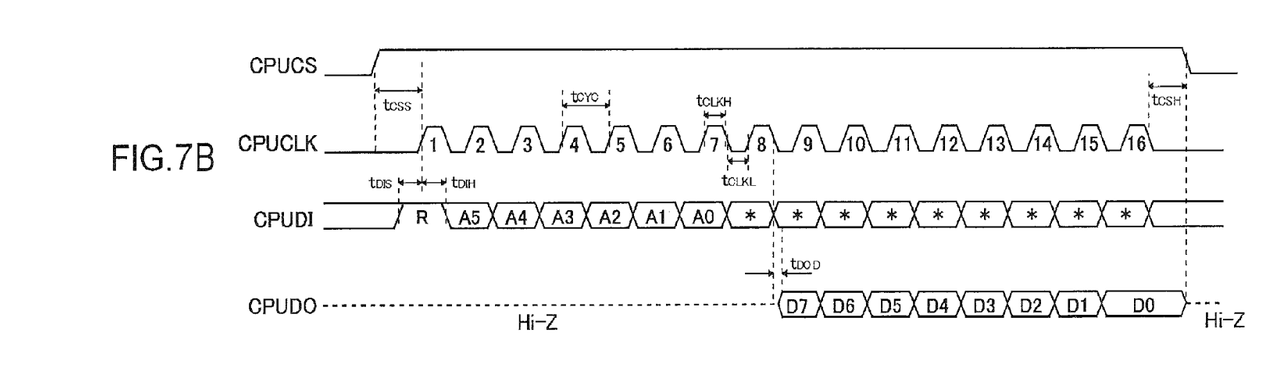

FIG. 7A and FIG. 7B are time charts which show data transmission/reception operations between the driver IC 100a and the CPU. FIG. 7A shows a writing operation cycle. FIG. 7B is a reading operation cycle. When the first bit data of the data CPUDI is at the low level immediately after the chip select signal CPUCS transits to the high-level state, the operation state is set to the writing cycle state. The subsequent six bits A5 through A0 indicate the address of the destination to be accessed. A redundant bit (*) is provided after the address data. The data D7 through D0 to be written are then transmitted as the subsequent eight bits data.

When the first bit data of the data CPUDI is at the high level immediately after the chip select signal CPUCS transits to the high-level state, the operation state is set to the reading cycle state. The subsequent six bits A5 through A0 indicate the address of the destination to be accessed. The data D7 through D0 stored at the addresses thus specified are then transmitted as the data CPUDO which is the subsequent data beginning with the ninth cycle.

An interface unit 62 includes a serial/parallel conversion circuit which converts serial data from the CPU into parallel data. The data thus received from the CPU is written to the specified address in the register included within the logic unit 64. The data output from the CPU includes various kinds of setting signals which are instructions for operating the LED driving circuit 100, in addition to the aforementioned luminance setting data PWMLED. Detailed description will be made later regarding the various kinds of signals.

The pulse signal PWM1 to be supplied to the driving unit DRV1 is generated as described below.

The logic unit 64 includes a 10-bit counter. The logic unit 64 sets the pulse signal PWM1 to the level that sets the transistor M14 to the ON state during the period before the counter counts a count value specified by the luminance setting data PWMLED1. During the remaining count period, the logic unit 64 sets the pulse signal PWM1 to the level that sets the transistor M14 to the OFF state. That is to say, in a case in which all the bits of the luminance setting data PWMLED1 are 0, the duty ratio of the pulse signal PWM1 is set to 0/1024. In a case in which all the bits of the luminance setting data PWMLED1 are 1, the duty ratio of the pulse signal PWM1 is set to 1023/1024.

The logic unit 64 generates the pulse signals PWM1 through PWM8 by simultaneously performing the same processing in a parallel manner.

Description will be made below regarding various kinds of setting signals output from the CPU. The registers are configured in units of 8 bits. The following setting data is assigned for each address.

Address 00H: PWM control data (PWMCNT)
Address 01H: LED enable data (LEDEN)
Address 02H: luminance setting data for channel 1 (SETPWM11)
Address 03H: luminance setting data for channel 1 (SETPWM12)
Address 04H: Luminance Setting Data for Channel 2 (SETPWM21)
Address 05H: luminance setting data for channel 2 (SETPWM22)
Address 06H: luminance setting data for channel 3 (SETPWM31)
Address 07H: Luminance Setting Data for Channel 3 (SETPWM32)
Address 08H: luminance setting data for channel 4 (SETPWM41)
Address 09H: luminance setting data for channel 4 (SETPWM42)
Address 0AH: luminance setting data for channel 5 (SETPWM51)
Address 0BH: luminance setting data for channel 5 (SETPWM52)
Address 0CH: Luminance Setting Data for Channel 6 (SETPWM61)
Address 0DH: luminance setting data for channel 6 (SETPWM62)
Address 0EH: luminance setting data for channel 7 (SETPWM71)
Address 0FH: luminance setting data for channel 7 (SETPWM72)
Address 10H: luminance setting data for channel 8 (SETPWM81)
Address 11H: Luminance Setting Data for Channel 8 (SETPWM82)

Figure 8A:
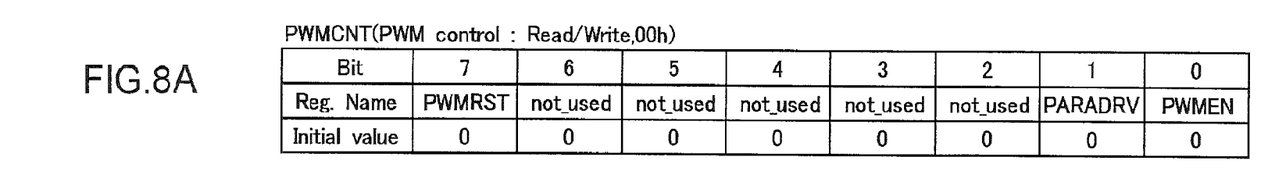
FIGS. 8A through 8C are diagrams which show address maps for registers.
Figure 8B:
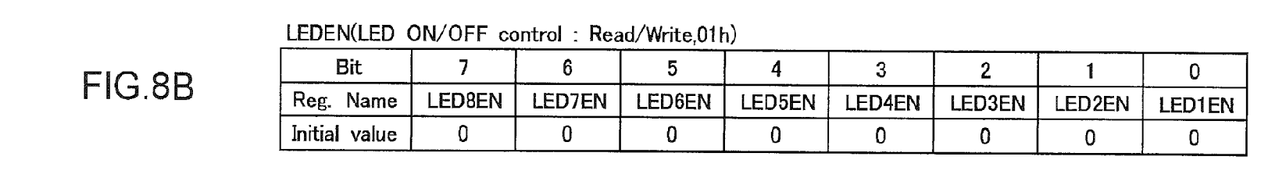
Figure 8C:
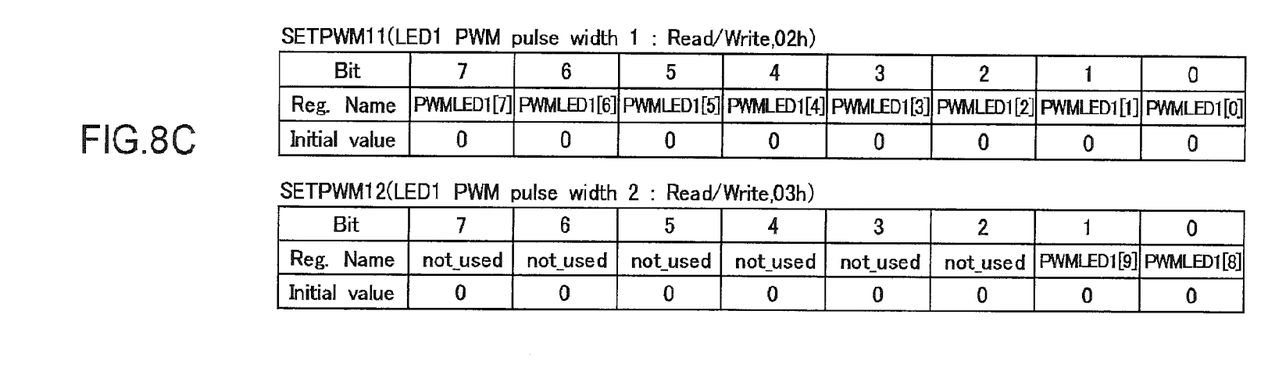

FIG. 8A through FIG. 8C show address maps for the registers.

1. PWM Control Data (PWMCNT)

The PWM control data includes various kinds of data described below, for PWM controlling the light emitting unit ULED. FIG. 8A shows an address map for the PWM control register.

1.1 PWM Reset Data (PWMRST)

The PWM reset data (PWMRST) is stored at the highest-order bit. When the PWMRST is set to "1", the normal operation is performed. When the PWMRST is set to "0", the logic unit 64 is reset.

1.2 PWM Enable Data (PWMEN)

The PWM enable data (PWMEN) is stored in the lowest order bit. When "1" is written as the PWM enable data, the duty ratios of all the channels of the light emitting units ULED1 through ULED8 are updated.

1.3 Parallel Driving Setting Data (PARADRV)

The parallel driving setting data (PARADRV) is stored in the lower-order second bit. When the PARADRV is 0, the driving mode is set to the independent driving mode, thereby independently controlling the luminance of each channel of the light emitting units ULED1 through ULED8. When the PARADRV is 1, the driving mode is set to the parallel driving mode. In the parallel driving mode, the values of the luminance setting data PWMLED2, PWMLED4, PWMLED6, and PWMLED8 are ignored, and the values of PWMLED1, PWMLED3, PWMLED5, and PWMLED7 are used.

1.4 The Higher-Order Second to Sixth Bits are Not Used.

2. LED Enable Data (LEDEN)

FIG. 8B shows an address map for an LED enable register.

The bits LED1EN through LED8EN of the LED enable data LEDEN are data which specifies the light emission modes for the light emitting units ULED1 through ULED8, and this data is stored in order from the least significant bit (LSB) to the most significant bit (MSB).

When the LED1EN is 0, the light emitting unit ULED1 is switching driven with a duty ratio according to the value of the luminance setting data PWMLED1. When the LED1EN is 1, the light emitting unit ULED1 is DC driven, instead of being switching driven.

3. Luminance Setting Data (SETPWM)

The luminance setting data SETPWM11 and SETPWM12 form the luminance setting data PWMLED1. 10 bits of a total of 16 bits are used for the luminance setting data PWMLED for the light emitting unit LED1. FIG. 8C shows an address map for a luminance setting register.

All the bits of the luminance setting data SETPWM11 and the lower-order second bits of the luminance setting data SETPWM12 provide the luminance setting data PWMLED1. The other bits are not used.

The same can be said of the luminance setting data SETPWM21, 22, 31, 32, 41, 42, 51, 52, 61, 62, 71, 72, 81, and 82.

The above is a description of the various kinds of setting data.

Returning to FIG. 2, an open-circuit/short-circuit detection unit 72 monitors the electric potentials at the terminals LED1 through LED8, and detects whether or not each of the light emitting units ULED1 through ULED8 is in an open-circuit state or a short-circuit state. A timer 74 is connected to the open-circuit/short-circuit detection unit 72. In a case in which such an open-circuit state or short-circuit state continues for a predetermined period of time, the open-circuit/short-circuit detection unit 72 notifies the current driver 70. The current driver 70 stops the driving operation for the channel at which the open-circuit state or the short-circuit state has occurred. A capacitor CP2, which sets the time constant of the timer 74, is connected to a capacitor terminal provided as the 5th pin. A fail signal FAIL2, which is set to a predetermined level in a case in which such an open-circuit state or short-circuit state has occurred, is output via a fail terminal FAIL2 provided as the 7th pin.

A test terminal provided as the 19th pin, and a TOUT terminal provided as the 26th pin are provide as test terminals.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding modification.

In the embodiments, the bipolar transistors and the MOSFETs can be mutually exchanged. Furthermore, the N-channel MOSFETs and the P-channel MOSFETs, and the NPN bipolar transistors and the PNP bipolar transistors can be mutually exchanged by mutually exchanging the power supply voltage and the ground voltage.

The settings of the logical values of the signals, such as the high-level state and the low-level state of the logical values, have been described in the present embodiment for exemplary purposes only. The settings can be freely modified by inverting the signals using inverters or the like as appropriate.

While the preferred embodiments of the present invention have been described using specific terms, such description is for illustrative purposes only, and it is to be understood that changes and variations may be made without departing from the spirit or scope of the appended claims.

The invention claimed is:

1. A driving circuit for a plurality of channels of light-emitting diodes providing a function as a backlight for a liquid crystal panel, comprising:
    an interface unit which receives, from an external processor, a luminance setting signal which specifies a luminance for each channel;
    a logic unit which receives a signal from the interface unit, and generates pulse signals, each having a duty ratio that corresponds to a luminance of the light emitting diode in the corresponding channel;
    a current setting unit which generates a constant current based upon an external voltage;
    a plurality of current mirror circuits, each of which generates based upon the constant current, a driving current to be applied to the light-emitting diode in corresponding channel; and
    a plurality of first transistors each of which switches the corresponding current mirror circuit between an ON state and an OFF state according to the pulse signal received from the logic unit, wherein the driving circuit is configured such that it can be switched between an independent driving mode in which the luminance of each of the plurality of channels of light-emitting diodes can be independently set according to an external signal and a parallel driving mode in which one selected from among the plurality of channels of light emitting diodes is driven by a plurality of the current mirror circuits.

2. A driving circuit according to claim 1, further comprising a booster circuit which supplies a driving voltage to an anode terminal of the light-emitting diode for each channel, and which monitors the cathode voltages of the plurality of channels of light-emitting diodes, and which adjusts the driving voltage such that the smallest electric potential selected from among the cathode voltages thus monitored matches a predetermined target value.

3. A driving circuit according to claim 1, wherein the logic unit includes a counter,
    and wherein the current mirror is set to an ON state according to the pulse signal during a period before a count value specified by the luminance setting signal is counted,
    and wherein the current mirror is set to an OFF state according to the pulse signal during the remainder of the count period.

4. A driving circuit according to claim 1, further comprising an oscillator which generates a clock signal,
    wherein the logic unit generates the pulse signal having a duty ratio that corresponds to the luminance, based upon the clock signal generated by the oscillator.

5. A driving circuit according to claim 1, wherein each of the plurality of current mirror circuits includes:
    a second transistor arranged such that a current that corresponds to a current generated by the current setting unit flows through a drain of the second transistor; and
    a third transistor arranged with a gate thereof connected to a gate of the second transistor such that a current that flows through corresponding one of the light-emitting diodes flows through a drain of the third transistor,
    wherein the gates of the second transistor and the third transistor are connected to a drain of corresponding one of the plurality of first transistors,
    and wherein the pulse signal output from the logic unit is input to the gates of the second transistor and the third transistor.

6. A driving circuit according to claim 4, wherein the oscillator can be operated in either a master mode or a slave mode, and wherein, in the master mode, the oscillator oscillates at a predetermined frequency so as to generate the clock signal, and outputs a signal synchronously with the clock signal, to an external circuit, and wherein, in the slave mode, the oscillator generates the clock signal synchronously with a signal input from an external circuit.

* * * * *